Sept. 17, 1968      R. C. FINK      3,401,425

DIMENSIONAL CONTROL SYSTEM

Filed April 14, 1965      6 Sheets-Sheet 1

INVENTOR
Robert C. Fink
BY
Dominik we Stein
ATTORNEYS

Sept. 17, 1968   R. C. FINK   3,401,425
DIMENSIONAL CONTROL SYSTEM
Filed April 14, 1965   6 Sheets-Sheet 2
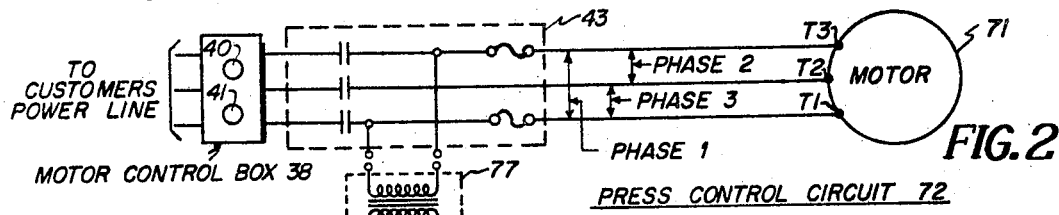
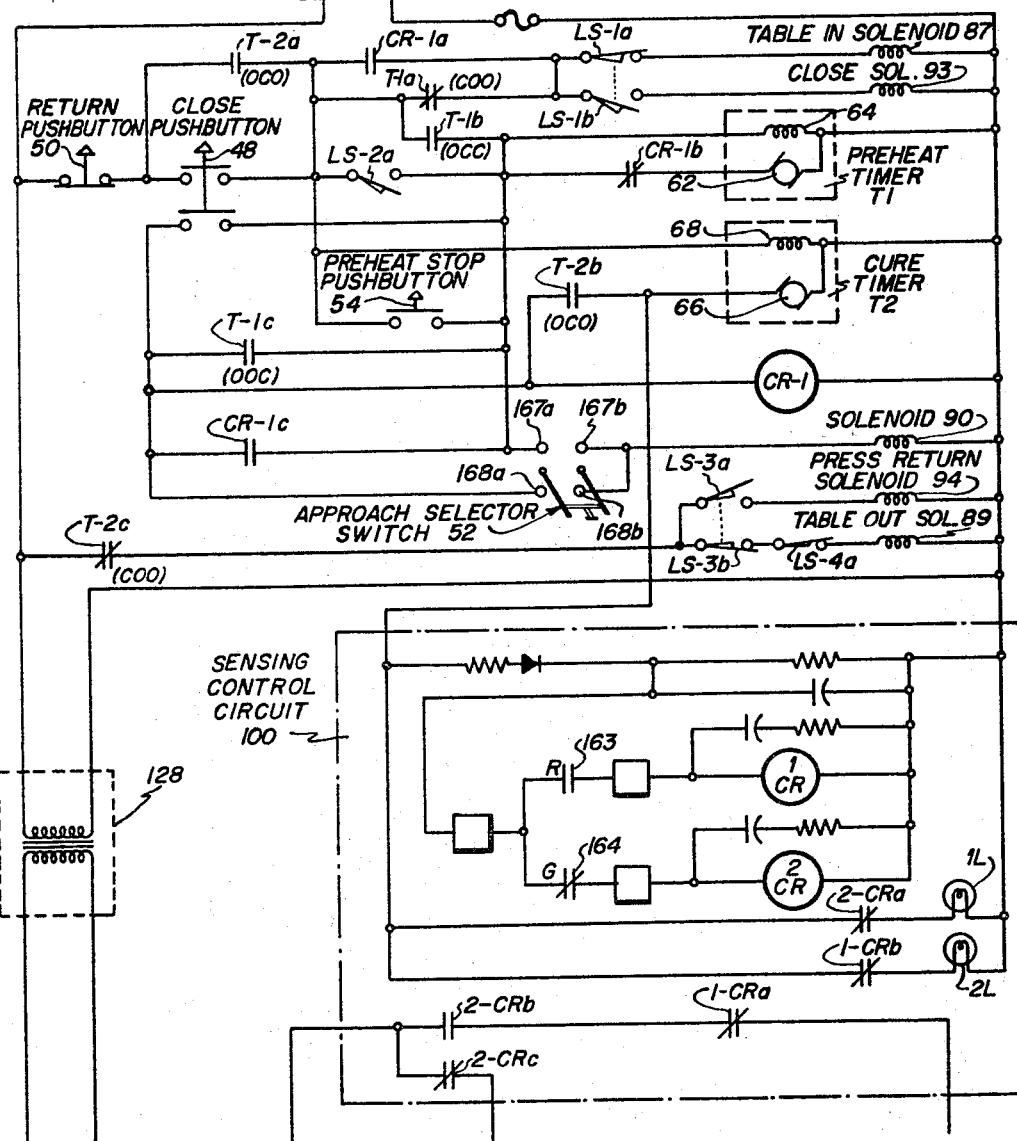
FIG.3
INVENTOR
Robert C. Fink
BY
Dominik and Stein
ATTORNEYS

MOTOR CONTROL CIRCUIT
102

Sept. 17, 1968    R. C. FINK    3,401,425
DIMENSIONAL CONTROL SYSTEM
Filed April 14, 1965    6 Sheets-Sheet 4

INVENTOR
Robert C. Fink
BY
ATTORNEYS

Sept. 17, 1968  R. C. FINK  3,401,425
DIMENSIONAL CONTROL SYSTEM
Filed April 14, 1965  6 Sheets-Sheet 6

INVENTOR
Robert C. Fink
BY
ATTORNEYS

United States Patent Office 3,401,425
Patented Sept. 17, 1968

3,401,425
DIMENSIONAL CONTROL SYSTEM
Robert C. Fink, Chicago, Ill., assignor to Ostrander-Seymour Co., Melrose Park, Ill., a corporation of Illinois
Filed Apr. 14, 1965, Ser. No. 448,148
18 Claims. (Cl. 18—17)

This invention relates to a dimensional control system for automatically applying pressure to an article, as required, during the forming of said article, to provide uniform and exact dimension to said article in the direction of the applied pressure.

The invention is particularly applicable for controlling presses used in producing plastic matrices and rubber plates for printing, for the effective thickness must not only be held within very close limits during the molding thereof but an exact thickness must be held throughout the area of the mat or plate being molded. The necessity for such exactness in producing plastic matrices and rubber plates for printing is well known in the graphic arts field. The invention is, as will be apparent from the description which follows, also applicable for controlling other types of presses to apply pressure to an article, in the same fashion. A typical example of the applicability of the dimensional control system of the present invention is its use in controlling the pressure applied to steel stock and the like as it is passed between a fixed and a movable roller, the control being exercised upon a movable roller to automatically adjust its position with respect to the fixed roller.

In U.S. Patent 3,089,188, issued May 14, 1963, to Otto Hoffman, apparatus is disclosed which is applicable for controlling presses used in producing plastic matrices and rubber plates for printing. The apparatus disclosed therein has two microswitches which are positioned in two opposite corners of the movable platen of the press and are carried by a pivotal arm so as to provide a fine micromatic adjustment. These microswitches control valves in the hydraulic system of the press to, in turn, control the pressure applied by the press to the article during the molding thereof. The operation of the press to provide exact dimensional control is therefore dependent upon the proper operation of the microswitches and also the critical adjustment of the pivotal arms upon which they are carried. In operation, it is found that the gases released from the material used in making the plastic matrices and rubber plates permeate the microswitches and form a coating on their contacts which change the operating characteristics of the microswitches. As a result, numerous false signals are generated which adversely affect the operation of the apparatus. In addition, the expansion and contraction of the pivotal arms change the operating characteristics so that exact dimensional control is difficult, if not impossible, to achieve. Also when these factors are taken in consideration along with the fact that mechanical devices and arrangements are subject to misalignment, wear, frictional disturbances and the like, the apparatus of the Hoffman patent is not as reliable and maintenance free as the people in the graphic arts field would like it to be so that uniform and exact dimensional control is assured.

It is therefore an object of this invention to provide a new and improved dimensional control system for automatically applying pressure to an article, as required, during the forming of the article, to provide uniform and exact dimension to said article in the direction of the applied pressure. In this respect, it is contemplated that the dimensional control system be versatile so as to be adaptable to control various apparatus, such as presses, rollers and the like.

It is a further object of this invention to provide a dimensional control system which is generally capable of providing dimensional control within limits of ±.00005 of an inch.

It is another object of the present invention to provide a dimensional control system wherein the sensing elements are "self-cleaning" and therefore are not adversely affected by the gases released from the materials or other foreign matter.

It is still another object of the invention to provide a dimensional control system wherein the sensing elements operate on a pneumatic principle and are therefore virtually maintenance free, are not subject to misalignment and are not subject to wear.

It is a still further object of this invention to provide a dimensional control system which may be adapted to existing apparatus, with a minimum amount of modification and therefore at a relatively small cost.

The above outlined objectives are accomplished with the dimensional control system of the present invention which, in its broadest aspect, utilizes a pair of pneumatic orifices which are bored, in the case of a press and the like, in the movable platen and, in the case of rollers and the like, in the pillow blocks or other elements capable of functioning in the manner hereinafter described. These orifices are constantly fed pneumatic pressure and the variations in the pressure are read by a gauge which is designed to convert pneumatic signals to electrical signals. The intelligence received by the gauge is then transmitted through appropriate solid stage circuitry to open or close a discharge hydraulic valve which bleeds hydraulic fluid off of the pumping system and thereby regulates the distance between a movable and a fixed platen, or between a movable and a fixed roller.

The invention accordingly comprises the several steps and the relation of one or more such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings; in which:

FIGURE 2 is a schematic diagram of the control circuitry for the press of FIG. 1;

FIGURE 3 is a schematic diagram of sensing control circuit, exemplary of the present invention, for controlling the press control circuit of FIG. 2;

Similar reference characters refer to similar parts throughout the several views of the drawings.

Figure 1:
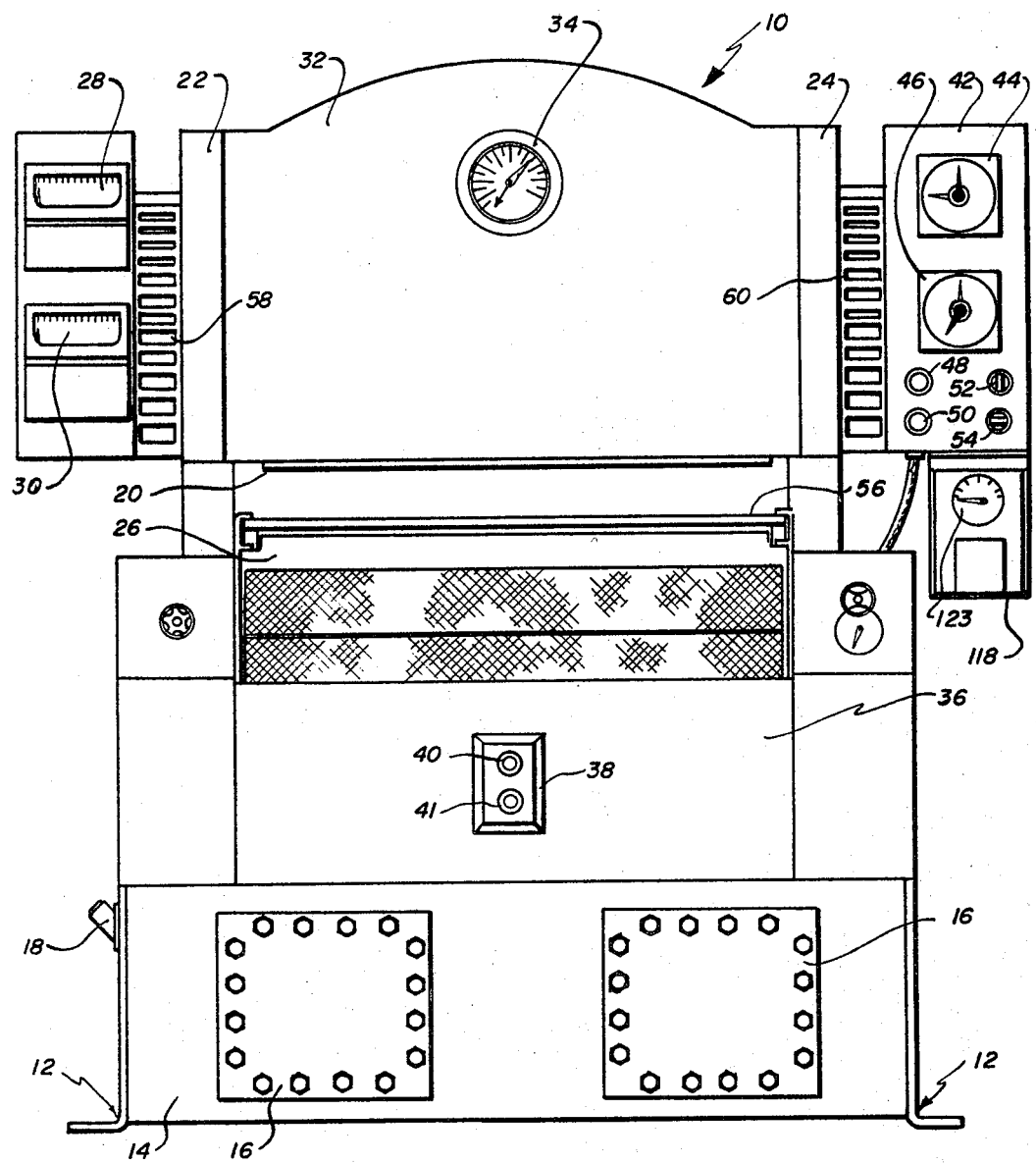
FIGURE 1 is a front plan view of a hydraulic press of the type generally used in the graphic arts field.

Referring now to the drawings, in FIG. 1 there is shown a press 10 which is of conventional construction and may be, for example, a press of the type sold under the name of "Moldmaster" by the Ostrander-Seymour Company, of Melrose Park, Ill. Basically, the press 10 has a base 12 between which is an oil tank 14 having two removable clean-out covers 16. An oil tank filler tube 18 is provided for filling the oil tank 14. Press 10 also has a fixed upper platen 20 secured between a pair of upright side rails or plates 22 and 24 and a lower movable platen 26 movably secured within the frame work of the press, in the manner well known in the art. Both the fixed upper platen 20 and the movable lower platen 26 are bored to provide internal passageways for steam, hot oil or electrical heaters for heating them. A pair of temperature indicators 28 and 30 are provided so that the operating temperature of the platens 20 and 26 are known at all times.

Secured to a top platen cover plate 32 is a hydraulic pressure gauge 34 which is operatively connected to indicate the pressure being applied to an article positioned between the upper and lower platens 20 and 26. Secured to a lower platen cover plate 36 is a motor control box 38 having start and stop buttons 40 and 41. A control unit 42 is secured to the side of the support rail 24 and provides the housing and support for a cure timer control 44, a preheat timer control 46, a close push button 48, a return push button 50, an approach selector switch 52 and a preheat stop push button 54.

A work table 56 is supported above the lower movable platen 26 and is adapted to be moved, automatically, into the press in functional working relationship with the platen 26, upon actuation of its control mechanism and to move out of the press upon completion of the molding cycle. Bearers are provided for establishing the desired dimensional thickness for the molded article, in a well known manner, as well as storage racks 58 and 60 for conveniently storing them when not in use.

Figure 4:
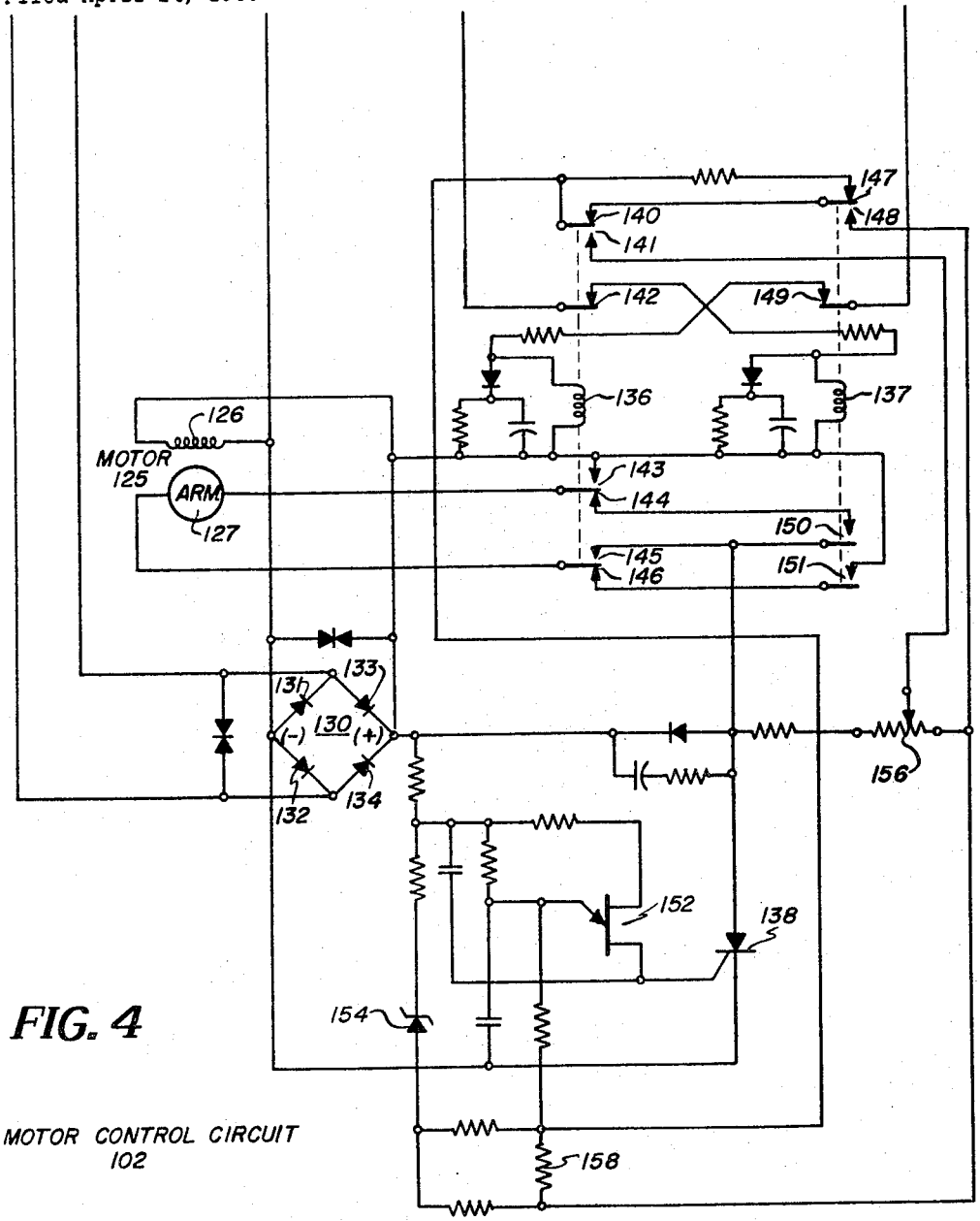
FIGURE 4 is a schematic diagram of a motor control circuit, exemplary of the present invention, for controlling the press control circuit of FIG. 2 and the sensing control circuit of FIG. 3.

The operation of the press 10 may be better understood by referring to FIGS. 2 and 4 which show the electrical and hydraulic circuitry of the press, respectively.

The press control circuit 72 includes, as its principal components, a preheat timer T1 which has a timer motor 62, a solenoid 64 and contacts $T-1_a$, $T-1_b$ and $T-1_c$ and a cure timer T2 which likewise has a timer motor 66, a solenoid 68 and contacts $T-2_a$, $T-2_b$ and $T-2_c$. The preheat timer T1 and the cure timer T2 each have three cycles of operation which may be generally referred to as reset, timing and timed out. During these cycles of operation, the contacts of the preheat timer T1 and the cure timer T2 are opened and closed in a predetermined fashion. The sequence of operation of each of these contacts is as set forth in the table below:

| Contact | Reset | Timing | Timed Out |
|---|---|---|---|
| $T-1_a$ | Closed | Open | Open |
| $T-1_b$ | Open | Closed | Closed |
| $T-1_c$ | do | Open | Do |
| $T-2_a$ | do | Closed | Open |
| $T-2_b$ | do | do | Do |
| $T-2_c$ | Closed | Open | Do |

The sequence of operation is also indicated in parentheses below each of the contacts in abbreviated form; the C indicating closed and the O representing open. The operation of preheat timer is generally as follows: its contacts are normally in the reset state and when the solenoid 64 is energized the contacts are operated to the timing state and will remain in this state until the timer motor 62 is energized and the preestablished timing cycle has elapsed or the solenoid 64 is deenergized; when the timer motor 62 is energized, the contacts will operate to the timed out state at the end of the established time cycle; and upon deenergizaion of the solenoid then return to the reset state. The cure timer T2 operates in a similar fashion.

The press control circuit also includes a number of limit switches LS–1 having contacts $LS-1_a$ and $LS-1_b$, LS–2 having a contact $LS-2_a$, LS–3 having contacts $LS-3_a$ and $LS-3_b$ and LS–4 having a contact $LS-4_a$. The limit switch LS–1 is engaged and operated by the work table 56 when it is properly positioned within the press. The limit switch LS–2 is engaged and operated by the work table 56 when it is vertically raised within the press to a predetermined level which is generally referred to as the prehead level. The limit switch LS–3 is engaged and operated by the movable platen 26 as it is moved from its static position within the press to prevent the table from being damaged due to premature raising of the movable platen 26. The limit switch LS–4 is engaged and actuated by the work table 56 when it is fully withdrawn from the press.

An approach selector switch 52 is included and provides three modes of operation for the raising of the movable platen 26, in a manner set forth in detail below.

Figure 5:
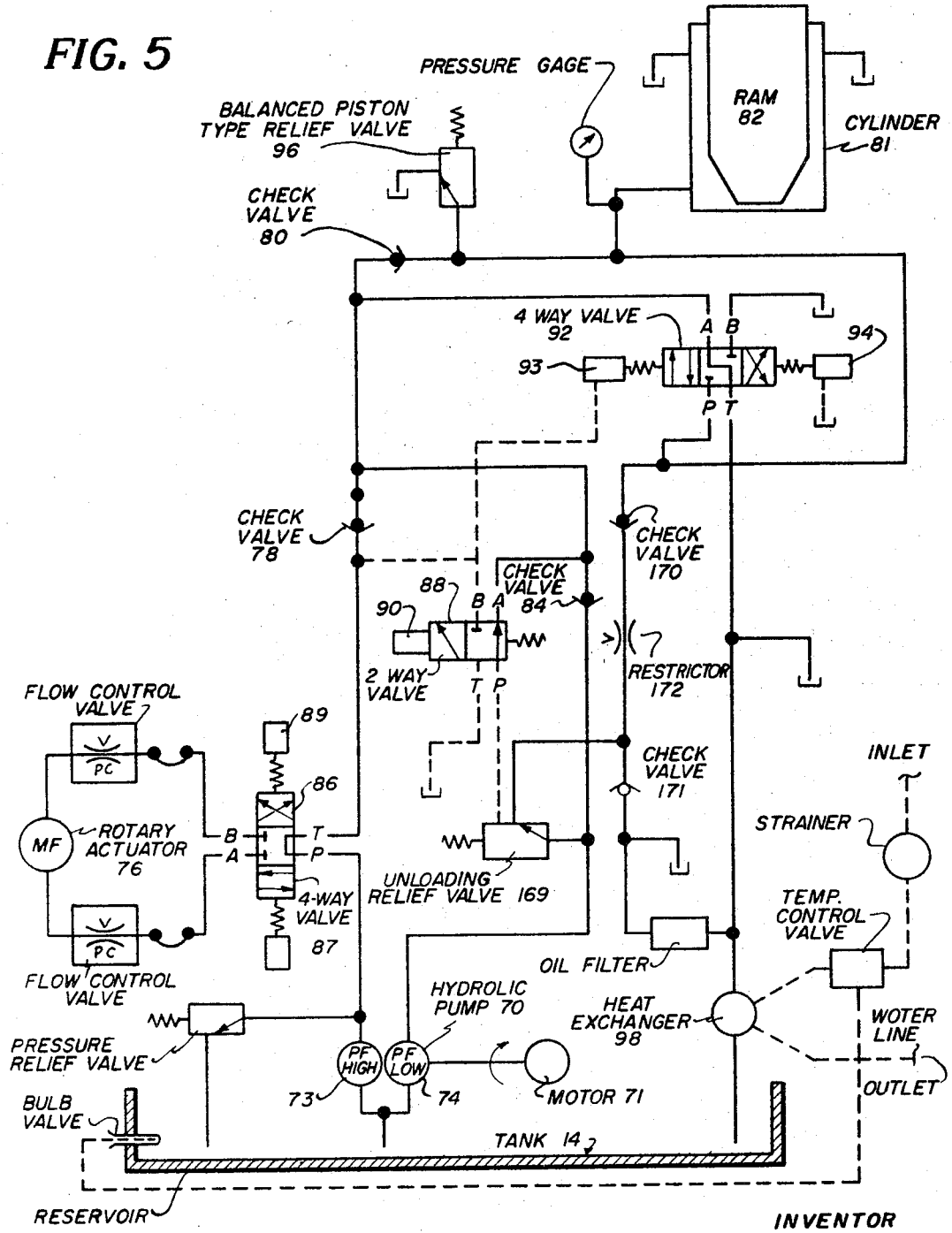
FIGURE 5 is a block diagram schematic of a hydraulic system exemplary of the present invention, for the press of FIG. 1.

The hydraulic circuitry of the press 10 is shown schematically in FIG. 5 and includes as one of its principal components a hydraulic pump 70 driven by the motor 71. The hydraulic pump 70 is actually a dual pump having a high pressure-low volume pump 73 and a low pressure-high volume pump 74. The output of the high pressure-low volume pump 73 is passed through a four way valve 86 having solenoids 87 and 89 which may be referred to as the table in and the table out solenoids, respectively. Solenoids 87 and 89 operate in a manner described more fully hereinafter to control the flow of hydraulic fluid to a rotary actuator 76 to, in turn, control the movement of the work table 56 into and out of the press 10. The output of the high pressure-low volume pump 73 is also passed through a check valve 78 which is adapted to provide a pilot pressure to, under certain circumstances, by-pass some of the hydraulic fluid to a two way valve 88 having a solenoid 90 for controlling its operation, and through another check valve 80 to the cylinder 81 of the press 10 to raise and lower the ram 82.

The output of low pressure-high volume pump 74 is passed through a check valve 84 and joined with the output of the high pressure-low volume pump 73 upstream of the check valve 78 so that both pumps deliver into a single conduit to the cylinder 81 of the press 10.

A four way valve 92 having solenoids 93 and 94 is included upstream of the junction of the outputs of the two pumps 73 and 74, between the check valves 78 and 80 for by-passing the outputs back to the oil tank 14 to control the raising and lowering of the ram 82 of the press 10.

A balanced piston type relief valve 96 coupled between the check valve 80 and the cylinder 81 is provided to control the constant pressure exerted on a work piece within the press 10, by bleeding hydraulic fluid from the supply fed to the cylinder 81. As explained more fully hereinafter, the valve 96 is automatically controlled to provide uniform and exact dimensional control of the work piece, by means of a sensing control circiut 100 and a motor control circuit 102.

The above described solenoids 87, 89, 90, 92, 93 and 94 are coupled in the circuitry of the press control circuit 72 and are energized in the manner described below to operate their associated valves to control the operation of the press 10. Also, additional components which are not specifically described above are included in the hydraulic circuitry shown in FIG. 5. Many of these components are provided in accordance with good practice in designing hydraulic circuitry to prevent overheating, build-up of pressure and the like while others are included to provide a particular mode of operation which is described in greater detail below.

The operation of the press control circiut 72 and the hydraulic circuitry of FIG. 5 may be generally described as follows. Upon energization of the press 10, by operating the start button 40 on the motor control box 38, the press control circuit 72 is energized through the transformer 77 and the motor 71 is energized through the starter circuit 43. When motor 71 is energized to drive the hydraulic pump 70 and before the operation of the press 10 is initiated, the output of the high pressure-low volume pump 73 is by-passed around the valve 86 and is caused to flow through the valve 92 and the heat exchanger 98, back to the oil tank 14. The output of the low pressure-high volume pump 74 flows through the check valve 84 and joins with the output of the high pressure-low volume pump 73 and is likewise returned to the oil tank 14 through the valve 92.

To initiate operation of the press 10, the close push button 48 of the press control circuit 72, which is a momentary operating push button, is depressed to close a circuit from one side of the transformer 77 through the normally closed return push button 50, the close push button 48, contact T–1$_a$, contact LS–1$_a$ of limit switch LS–1 (not shown) to energizes the table in solenoid 87 of valve 86. Upon operating solenoid 87, the output of the high pressure-low volume pump 73 flows through valve 86 to operate the lever acting type rotary actuator 76 which in turn, controls the mechanical mechanism for transporting the work table 56 into the press 10. Fluid forced out of the rotary actuator 76 flows through the valve 86, the check valve 78, the valve 92 and the heat exchanger 98, back to the oil tank 14.

Momentarily operating the close push button 48 also closes a circuit to energize the solenoid of the cure timer T2 to operate its contact T–2$_a$ to close a hold circuit to maintain the table in solenoid 87 of valve 86 operated, after the close push button 48 is released.

When the work table 56 is in its operative position within the press 10, the work table engages and operates the limit switch LS–1 to open its contact LS–1$_a$ to open the energizing circuit fo rthe table in solenoid 87 of valve 86, and at its contact LS–1$_b$ to close an energizing circuit for the close solenoid 93 of valve 92. Upon operating the close solenoid 93, the fluid pumped from the oil tank 14 by the hydraulic pump 70 is forced to flow through check valve 80 to the cylinder 81 of the press 10 to raise the ram 82 and hence the lower movable platen 26. It may be noted that the fluid pumped by both the high pressure-low volume pump 73 and the low pressure-high volume pump 74 of the hydraulic pump 70 are both delivered to the cylinder 81 and the ram 82 is thereby caused to be raised quite rapidly. The lower movable platen 26 upon reaching a predetermined position engages and activates the limit switch LS–2 (not shown) to close its contact LS–2$_a$ to close an energizing circuit for the solenoid 64 of the preheat timer T1. Solenoid 64 operates contact T–1$_a$ to open the hold circuit for the close solenoid 93 of valve 92; contact T–1$_b$ to close a hold circuit for itself; and contact T–1$_c$ which remains open and therefore has no effect at this time. Assuming that the approach selector switch 52 is in the position shown, that is, in an open position, solenoid 90 of valve 88 is not operated at this time and the fluid from the hydraulic pump 70 is again by-passed through valve 92 back to the oil tank 14. The check valve forward of the line leading to the valve 92 and the conditions established at this time are such that the lower movable platen 26 is maintained in its raised position.

The contact LS–2$_a$, in addition to energizing the solenoid 64 of the preheat timer T1, also activates the timer motor 62 of the preheat timer T1. Motor 62 is a variable timer which can be set to establish a preheat time of 0 to 20 minutes before the preheat timer T1 times out to activate its contacts to continue the automatic operation of the press 10.

After the preheat timer T1 times out and operates its contacts, contact T–1$_c$ closes an energizing circuit for relay CR–1 which, in turn, operates to close its contacts CR–1$_a$, CR–1$_b$ and CR–1$_c$. At its contact CR–1$_a$, an energizing circuit is closed through the limit switch contact LS–1$_b$ to again energize the close solenoid 93 of valve 92 and at its contact CR–1$_b$, opens the energizing circuit for the timer motor 62 of preheat timer T1. With the close solenoid 93 again energized, the fluid pumped by the hydraulic pump 70 is again forced to flow through check valve 80 to the cylinder 81 of the press 10 to raise the lower movable platen 26. The timer motor 66 of the cure timer T2 is also energized when contact T–1$_c$ is closed to start the cure timer cycle of the press 10. Without the addition of the dimensional control of the present invention, the pressure exerted upon the work piece between the fixed and movable platen of the press 10 is controlled by the relief valve 96 downstream from the input to the cylinder 81 of the press 10. The pressure established by the relief valve 96 is maintained upon the work piece until the cure timer T2 times out at which time it operates its contacts to their timed out positions, to initiate the opening operation of the press 10.

When the cure timer T2 times out and operates its contacts, at contact T–2$_a$ the hold circuit for the close solenoid 93 of valve 92 and the relay CR–1 is opened so that both of them are deenergized. At contact T–2$_c$, an energizing circuit is closed for the press return solenoid 94 of valve 92, through the contact LS–3$_a$ of the limit switch LS–3 (not shown) which was operated upon raising the movable platen 26 to close its contact LS–3$_a$ and to open its contact LS–3$_b$. The press return solenoid 94 of valve 92 conditions the valve 92 so that the fluid from the cylinder 81 of the press 10 and the outputs of the hydraulic pump 70 are returned directly to the oil tank 14 so that the movable platen 26 of the press 10 can be rapidly lowered.

When the movable platen 26 is restored to its initial starting position, the limit switch LS–3 is again operated to open its contact LS–3$_a$ to deenergize the press return solenoid 94 of valve 92 and closes its contact LS–3$_b$ to close an energizing circuit through the table out limit switch contact LS–4$_a$ for the table out solenoid 89 of valve 86. Upon actuation of the table out solenoid 89, the flow of fluid to the rotary actuator 76 is reversed so that the mechanical mechanism which controls the movement of the work table 56 is reversed in operation to withdraw the work table 56 from the press 10. When fully withdrawn, contact LS–4$_a$ of the limit switch LS–4 is opened, thereby deenergizing the table out solenoid 89. At this time, the outputs of the hydraulic pump 70 circulates through the valve 92, back to the oil tank 14, in the manner previously described.

Dimensional control of the work piece is established, in accordance with the present invention, by means of the sensing control circuit 100 and the motor control circuit 102 which are, in turn, fed intelligence from a pair of sensing devices in the form of pneumatic orifices 104 and 105 formed in opposite corners of the exposed surface of the upper fixed platen 20 of the press 10. The pneumatic orifices 104 and 105 are formed by drilling a hole 106 approximately ⅛ inch in diameter substantially through the upper platen to approximately ⅜ inch from its working surface. A smaller orifice 108 of approximately .078 inch is then extended through to the working surface of the platen 20. A circular groove 109 of approximately 3/32 inch deep and .125 inch in width is centered about the smaller orifice 108 and the surface of the platen 20 is removed to a depth of between .001 and .0005 inch, between the inner radius of the groove 109, as indicated by the reference numeral 110. The end of the large hole 106 is tapped and plugged. A second hole 112 is drilled into the platen so as to intersect the hole 106, and is tapped to provide a connection for a source of air. A groove 109. On opposite sides of each of the orifices 104 from its side edge and tangentially intersects the circular groove 109. On opposite sides of each of the orifices 104 and 105 there are provided two spring loaded plungers 116 which are adapted to engage the bearers (not shown) which are normally placed on the lower movable platen 26 to forcibly press the bearers flat against the surface of the platen.

Figure 6:
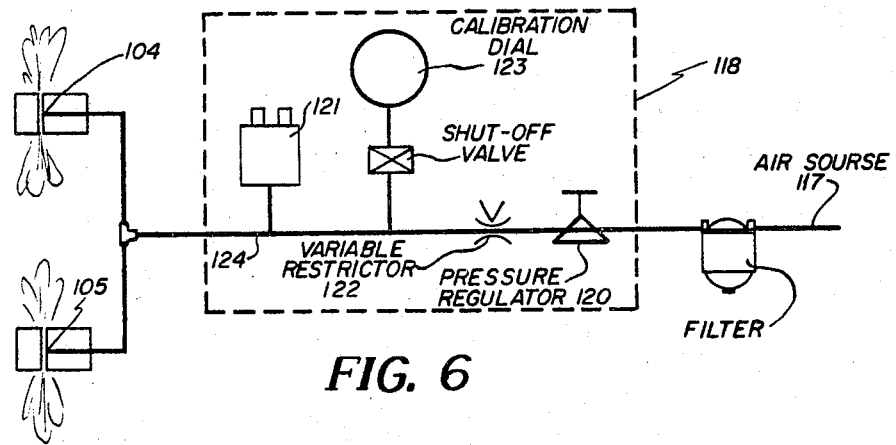
FIGURE 6 is a block diagram of pneumatic orifices exemplary of the present invention, and its associated circuitry for converting pneumatic pressure signals to electrical signals.

The orifices 104 and 105 (as best seen in FIG. 6) are supplied air from an air source 117 in constant volume. Included in the coupling between the orifices 104 and 105 and the air source 117 is a control unit 118 for detecting the variations in pressure at the orifice openings and for translating the difference in pressure to electrical signals for operating other control apparatus. The control circuit 118 is preferably of the type manufactured by the Sheffield Corporation and generally referred to as the Modulaire Signal Control (AU–125). The control circuit 118 includes a pressure regulator 120 for controlling air pressure and a variable restrictor 122 for controlling the rate of flow to the orifices 104 and 105, in a variable fashion. A calibration dial 123 is coupled to the supply line 124 for indicating the pressure at the orifice openings, and is calibrated to indicate whether the pressure is increasing or decreasing. Also coupled to the supply line 124 is an airlectric transducer 121 which detects the increase and decrease of pressure at the orifice openings and translates the pressure intelligence to electrical control signals which are used to control the operation of the press, in the manner hereinafter described.

A reversible, variable speed, direct current motor 125 having a field winding 126 and an armature 127 is coupled to the relief valve 96 and is controlled by the motor control circuit 102 to operate the relief valve 96, in accordance with signals received from the sensing control circuit 100.

The motor control circuit 102 is energized through an isolation transformer 128 which is coupled to a diode rectifier bridge 130, inoluding diodes 131–134, so as to provide a pulsating direct current to the field winding 126 and the silicon controlled rectifier circuitry described below. The field winding 126 of the motor 125 is coupled to the diode bridge 130 and rotation of the armature 127 is controlled by means of two relays 136 and 137 and the silicon controlled rectifier 138 and its associated control circuitry. Energization of the relays 136 and 137 is controlled by means of the relays 1CR and 2CR of the sensing control circuit 100 which have contacts 1CR$_a$, 1CR$_b$, 2CR$_a$, 2CR$_b$ and 2CR$_c$, respectively, to control the direction of current flow through the armature 127.

In order to explain this operation, assume for the moment that relay 1CR is energized to open its normally closed contact 1CR$_b$ and that relay 2CR is not energized so that contact 2CR$_c$ is closed and contact 2CR$_b$ is open. Under these conditions, current flows from the positive side of the diode bridge 130 through the coil of the relay 137, through the normally closed contact 142 of the relay 136, through normally closed contact 2CR$_c$ to the negative terminal of the diode brige 130 and the relay 137 is energized to operate its contacts 147–151. When relay 137 is energized, current flows through the armature 127 from the positive side of the diode bridge 130, through the contact 151, contact 146 of the relay 136, the armature 127, the contact 144 of the relay 136, contact 150 of the relay 137, the silicon controlled rectifier 138, to the negative terminal of the diode bridge 130.

The silicon controlled rectifier 138 is fed positive going pulses from the unijunction transistor 152 to trigger its operation to conduct current through the armature 127. The diode bridge 130 provides pulsating direct current to the unijunction transistor 152 which is regulated by the Zener diode 154 to provide a substantially constant source of direct current to it. The pulsating direct current is likewise supplied to the silicon controlled rectifier 138 to turn it off periodically and the conduction time of the silicon controlled rectifier 138 is controlled by means of the firing cycle of the unijunction transistor 152.

When relay 2CR is energized to close its contact 2CR$_b$ and relay 1CR is not energized, current flows from the positive side of the diode bridge 130, through the coil of the relay 136, through the contact 149 of the relay 137, through the normally closed contact 1CR$_b$, through contact 2CR$_b$ which is now closed, to the negative terminal of the diode bridge 130, thereby energizing the relay 136. With relay 136 energized, current flows from the positive side of the diode bridge 130, through the contact 143 of the relay 136, through the armature 127, through the contact 145 of the relay 136, through the silicon controlled rectifier 138, to the negative terminal of the diode bridge 130. In this case it may be noted that the current flow is in opposite direction to that previously described. Also, the potentiometer 156 is coupled in parallel with the resistor 158 included in the RC time constant circuit which determines the time cycle of the unijunction transistor and by varying the potentiometer 156, the speed of the motor 125 can be controlled.

The direction of rotation of the motor 125 is therefore controlled by the relays 136 and 137 and the silicon controlled rectifier 138 and its associated circuitry, in accordance with the operative state of the relays 1CR and 2CR of the sensing control circuit 100. The airlectric transducer 121 controls the energization of the relays 1CR and 2CR, in accordance with intelligence from the orifices 104 and 105 in the surface of the upper fixed platen 20 of the press 10. The sensing control circuit is coupled through contact T–2$_b$ of cure timer T2 to one side of the transformer 77 and is directly connected to its other side so that it is energized at the same time as the timer motor 66 of the cure timer T2 is energized. When timer motor 66 is energized, current flows through conductor 160, resistor 161 and diode 162 to the other side of the transformer 77.

The timer motor 66, it may be recalled, is energized when the preheat timer T1 times out and operates its contact T–1$_c$. This occurs just prior to the time that the press 10 exerts pressure on the workpiece, and the sensing control circuit 100 is therefore energized at the time any pressure is exerted. Bearers (not shown) of substantially the dimensions desired for the workpiece are placed on the platen 26 in the well known manner and these bearers are engaged and forcibly urged flat against the surface of the platen 26 by the spring loaded plungers 116 to eliminate any bowing or the like so that they lie flat on the platen. The orifices 104 and 105 are acurately gauged so that a predetermined pressure is established when the bearers engaged and forcibly urged flat against the surface of the from the orifices 104 and 105. Any deviation from this pressure is detected by the airlectric transducer 121 which then converts or translates this intelligence to electrical signals to control the operation of relays 1CR and 2CR. These relays, in turn, control the direction of rotation of the motor 125 which is coupled to the relief valve 96 controlling the flow of hydraulic fluid to the cylinder 81 of the press 10.

The airlectric transducer 121 includes a slave relay (not shown) having a normally open contact 163 and a normally closed contact 164. When the press 10 is closing and the sensing control circuit 100 is energized, current flows through contact 164 and relay 2CR, thereby energizing relay 2CR. When relay 2CR is energized, current flows in the motor control circuit 102, in the manner previously described, to cause motor 125 to rotate in one direction to close the relief valve 96, to thereby deliver more hydraulic fluid to the cylinder 81 of the press 10.

When the airlectric transducer 121 detects an increase in pressure, indicating that less pressure is to be exerted upon the workpiece, it closes contact 163 to cause current to flow through relay 1CR which is then energized to close its contact 1CR$_b$. Operation of the contact 1CR$_b$ causes current to flow through the motor armature 127, in the manner previously described, to cause relief valve 96 to bleed off some of the hydraulic fluid delivered to the cylinder 81 of the press 10, so that the pressure at the orifices 104 and 105 decreases and less pressure is exerted upon the workpiece. The intelligence coupled to the airlectric transducer from the orifices 104 and 105 will cause airlectric transducer 121 to alternately open and close the contacts 163 and 164, so that the proper pressure is always exerted upon the workpiece as it is being formed, regardless of any expansion or contraction of the workpiece during this time.

A visual indication that relay 1CR or 2CR is energized, and hence whether the press is exerting pressure on the workpiece, is indicated by means of the lamps 165 and 166 which are energized through the contacts 1CR$_a$ and 2CR$_a$, respectively, as the relays 1CR and 2CR are energized. A visual indication is also provided by the calibration dial 123.

From the above description it can be seen that uniform and exact dimensional control is provided by the press 10, in accordance with the intelligence conveyed to the airlectric transducer 121 of the sensing control circuit 100, from the orifices 104 and 105. This intelligence is translated to electrical signals by the sensing control circuit 100 to control the operation of the motor 125 of the motor control circuit 102 to, in turn, control the rate at which hydraulic fluid is bled from the supply being delivered to the cylinder 81 of the press 10.

It may be noted that the orifices 104 and 105 are "self cleaning" since the air being expelled from them prevents any gases or other foreign matter from entering them which would cause faulty operation. Furthermore, the orifices 104 and 105 are not subject to misalignment, nor do they need periodic adjustment, hence the difficulties of the type previously encountered are eliminated. The sensing devices of the present invention are therefore virtually maintenance free.

It may also be noted that the dimensional control provided by the present invention can be easily adapted to existing presses of the type first described. This is generally accomplished by forming the orifices 104 and 105 in the surface of the fixed platen, in the manner described; adapting the sensing control circuit 100 and the motor control circuit 102 to the press control circuit 72; and by coupling the motor 125 to the relief valve 96. It is apparent that it can likewise be adapted to other types of presses, as well as other similar apparatus.

The approach selector switch 52, as mentioned above, provides three modes of operation for the raising of the movable platen 26. In each of these modes of operation, the dimensional control circuitry functions in the manner described above and only the operation of the press control circuit 72 and the hydraulic circuitry of FIG. 5 is modified. The other two modes of operation are briefly described below.

When the approach selector switch 52 is operated to close the contacts 167a and 167b, solenoid 90 of valve 88 is energized at the same time as the solenoid 64 and the timer motor 62 of the preheat timer T1 is energized, rather than after the preheat timer T1 has timed out. It may be recalled that in the latter case, the movable platen 26 was held in the preheat position and was not raised during the preheat time cycle. When the solenoid 90 of the valve 88 is operated as described above, however, a pilot pressure is established by the check valve 78 to maintain a flow of fluid through the valve 88 to an unloading relief valve 169 which is sufficient to operate it. With the unloading relief valve 169 operated, the output of the low pressure-high volume pump 74 is delivered to the cylinder 81 of the press 10, through a pair of check valves 170 and 171 and a restrictor 172. The two check valves are balanced in a manner such that only a sufficient flow of fluid is permitted which will cause the ram 82, and hence the movable platen 26, to "creep" upwardly. If the platen 26 encounters any pressure, or resistance, the flow of fluid is bled off and returned to the oil tank 14. This mode of operation permits the movable platen 26 to be raised in a "creeping" fashion during the preheat cycle so that upon the completion of the preheat cycle the press, or platen 26 is already positioned for the cure cycle. In cases, where the preheat cycle and cure cycle are of short duration, this mode of operation can be used to expedite the operation of the press 10 in forming the article.

When the approach selector switch 52 is operated to close contacts 168$_a$ and 168$_b$, the operation of the press 10 is substantially the same as the first described mode of operation, but solenoid 92 of valve 88 is energized upon completion of the preheat cycle. In this case, the movable platen 26 is raised in a "creeping" fashion, rather than quite rapidly as when the solenoid 92 is not energized. This mode of operation permits the operator to advance, or raise, the movable platen 26 slowly, which in some cases, is very desirable, depending on the type of material being formed.

Figure 10:
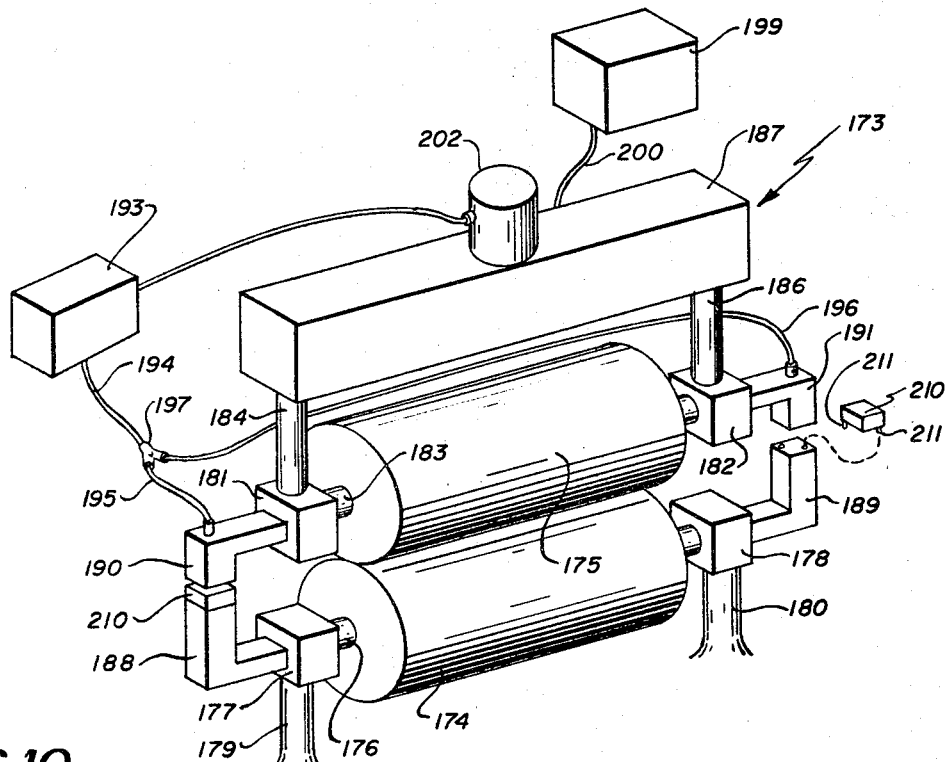
FIGURE 10 is a perspective view of a press having a pair of rollers, illustrating how the dimensional control system of the present invention can be used to adjustably position the movable roller to provide exact dimensional control.
Figure 8:
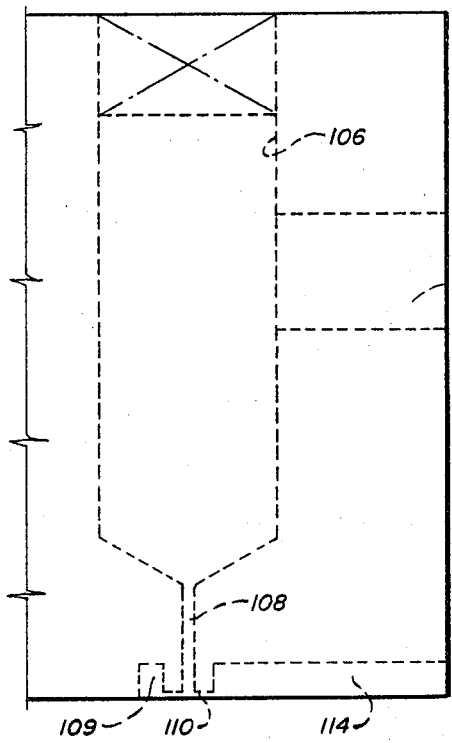
FIGURE 8 is a sectional view taken along lines 8—8 of FIG. 7.
Figure 7:
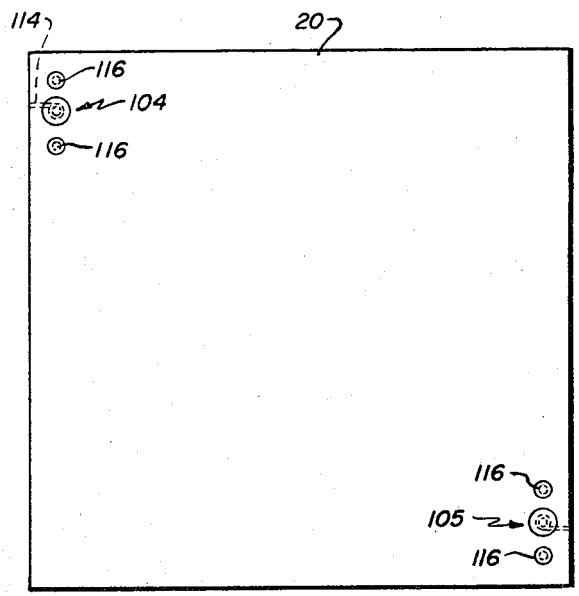
FIGURE 7 is a plan view of the working surface of the platen of the press of FIG. 1, illustrating the pneumatic orifices formed therein.
Figure 9:
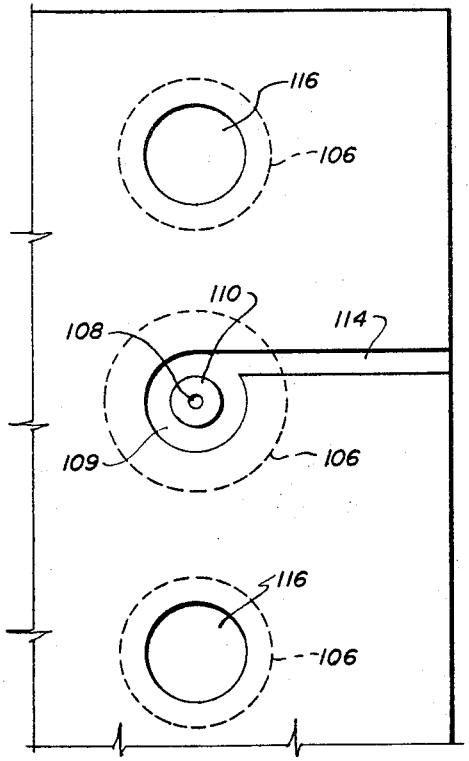
FIGURE 9 is an enlarged top plan view of the pneumatic orifice formed in the platen.

Referring now to FIG. 10, it can be seen how the dimensional control system of the present invention is adapted to a roller press 173 to control the pressure applied to steel stock and the like as it is passed between a fixed roller 174 and a movable roller 175, to provide uniform and exact dimension to it.

In this illustrative embodiment, the fixed roller 174 has its axle 176 rotatably supported at each of its ends by means of bearing assemblies 177 and 178 which are rigidly supported upon an axle support mounting 179 and 180, respectively. The movable roller 175 has its axle 183 likewise rotatably supported at each of its ends by means of bearing assemblies 181 and 182. The bearing assemblies 181 and 182 are fixedly secured to the ends of a piston 184 and 186, respectively, of a hydraulic cylinder (not shown) enclosed within the framework 187 which is fixedly supported in any suitable fashion so as to provide a stable support for the hydraulic cylinders.

An L-shaped arm 118 and 190 is secured to respective ones of the bearing assemblies 177 and 181 and are arranged so that the ends thereof are aligned to provide two mating surfaces. A pair of L-shaped arms 189 and 191 are secured to the bearing assemblies 178 and 182 in similar fashion. The mating surfaces of the L-shaped arms 190 and 191 are each provided with a pneumatic orifice (not shown) which is similar to the pneumatic orifices 104 and 105 formed in the fixed platen 20 of the press 10. These orifices, like the orifices 104 and 105, are supplied with a constant volume of air from an air source (not shown), included within pneumatic system control 193, by means of the line 194 and the lines 195 and 196 extending from the Y-shaped coupler 197. The system control 193 also includes a sensing control circuit, a motor control circuit and the airlectric transducer and its associated components, each of which is of the type previously described.

The hydraulic cylinders included within the framework 187 are supplied with hydraulic fluid from the hydraulic system 199 through a line 200 which includes a relief valve (not shown), like relief valve 96 of the hydraulic circuit of FIG. 5. A motor 202 is coupled to the relief valve and is controlled in the manner described above, to operate the relief valve to bleed fluid from the supply delivered to the cylinders.

In operation, the spacing between the movable roller 174 and the fixed roller 172 is varied under control of the hydraulic circuit 199, by expelling and retracting the pistons 184 and 186. The pressure at the orifice outlets in the mating surfaces of the L-shaped arms 188–191 is detected by the airlectric transducer to operate the sensing control circuit and the motor control circuit, in the manner described above, to in turn operate the motor 202. The motor 202 in turn controls the relief valve to bleed hydraulic fluid from the supply delivered to the cylinders to maintain the desired pressure on the material passing between the rollers 172 and 174, to provide uniform and exact dimension to the material.

A number of different size blocks 210 having studs 211 which are adapted to fit within correspondingly shaped holes 212 formed in the mating surface of the L-shaped arms 188 and 189 are provided to establish different spacings between the rollers 172 and 174. The blocks 210 are analogous to the bearers used with the press 10, and function in substantially the same manner.

It may be further noted that the platens 20 and 26 are brought into parallelism if they are out of alignment due to the workpiece being off-center, having a varying thickness and the like by the operation of the dimensional control system of the present invention. This is due to the fact that the airlectric transducer 121 detects the resultant pressure established at the orifices 104 and 105. If the movable platen 26 is misaligned so that one of its sides, that is, one of the bearers placed on it, contacts the surface of the fixed platen 20 before the other side so that either the orifice 104 or 105 is substantially engaged with the bearer, the other one of the two orifices will be spaced at a greater distance from the bearer and the pressure will be less than the preestablished pressure. Accordingly, the press will continue to close until the two platens are parallel, at which time the orifices 104 and 105 will be equally spaced with respect to the bearers placed on the movable platen and the predetermined pressure is established and detected.

In this respect, the operation of the sensing means of the present invention constitutes a substantial improvement over the sensing means of the above mentioned Hoffman patent. In that patent, the sensing means are positioned externally of the working surfaces of the platens so that any misalignment of, or inaccuracies in, the bearers will prevent the two platens from being parallelly aligned. With the present invention, since the orifices 104 and 105 are substantially centrally positioned with respect to the surface of the bearers the platens 20 and 26 must of necessity be parallel before the airlectric transducer 121 detects the predetermined established pressure.

The above principle of operation also makes the present invention particularly adaptable to presses of the type having a double, rather than a single, ram platen. In this respect, the operation is analogous to the operation of the hydraulic cylinders of the roller press 173, in FIG. 10. That is, the control is exerted upon each of the ram cylinders to urge the movable platen in parallel with the fixed platen. It is, of course, apparent that each of the rams could be independently controlled, by duplicating the above described sensing control circuit 100 and motor control circuit 102.

The invention has been described including a hydraulic relief valve for controlling the flow of hydraulic fluid to the press, which valve is, in turn, controlled by a motor. It is apparent, however, that other types of valves can be used in substitute for the relief valve and operated by the sensing control circuit 100. A typical example would be the substitute of an on-off type solenoid directional valve which would control the flow of hydraulic fluid to the cylinder.

It may therefore be noted from the above description that the only pressure applied to the bearers is the low valve found desirable to insure full contact of the bearers with one another and with the platens 20 and 26 between which they are placed plus such pressure as may be required to bring the platens into parallel alignment. It may also be seen that in effect the thickness of the workpiece being produced is accurately gaged to within .00005 inch from all corners of the press, by the operation of the dimensional control system detecting the differential in the predetermined pressure established at the orifices 104 and 105 when the bearers engage the upper platen 20, thereby restricting the air flow from the orifices 104 and 105.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A dimensional control system for automatically applying pressure to an article, as required, during the forming of said article, to provide uniform and exact dimension to said article in the direction of the applied pressure comprising, in combination: a first member; a second member adapted to be adjustably positioned relative to said first member to vary the pressure exerted upon an article therebetween; orifice means formed in a surface which is operatively related to one of said first and second members and in mating relationship to a surface operatively related to the other one of said first and second members, said orifice means being formed so as to establish a varying pressure at the outlet thereof when said surfaces are moved relative to one another to vary the spacing therebetween; positioning means for adjustably positioning said second member relative to said first member; and control means responsive to the varying pressure at the outlet of said orifice means for controlling said positioning means to adjustably position said second member relative to said first member to establish and maintain a predetermined pressure at the outlet of said orifice means.

2. A dimensional control system, as claimed in claim 1, wherein said orifice means comprising a circular groove having a predetermined inner and outer radius and a predetermined depth, an aperture centrally positioned within said inner radius and adapted to have a source of pneumatic pressure coupled thereto, the surface material within said inner radius being removed so as to permit penumatic pressure to flow from said aperture into said groove.

3. A dimensional control system for automatically applying pressure to an article, as required, during the forming of said article, to provide uniform and exact dimension to said article in the direction of the applied pressure comprising, in combination: a first member; a second member adapted to be adjustably positioned relative to said first member to vary the pressure exerted upon an article therebetween; orifice means formed in a flat surface which is operatively related to said second member and in mating relationship to a flat surface which is operatively related to said first member, said orifice means being formed so as to establish a varying pressure at the outlet thereof when said flat surfaces are moved relative to one another to vary the spacing therebetween; positioning means for adjustably positioning said second member relative to said first member; and control means responsive to the varying pressure at the outlet of said orifice means for controlling said positioning means to adjustably position said second member relative to said first member to establish and maintain a predetermined pressure at the outlet of said orifice means.

4. A dimensional control system for automatically applying pressure to an article, as required, during the forming of said article, to provide uniform and exact dimension to said article in the direction of the applied pressure comprising, in combination: a first member; a second member adapted to be adjustably positioned reltive to said first member to vary the pressure exerted upon an article therebetween; first alignment means having a flat surface thereon operatively related to said first member; second alignment means having a flat surface positioned in mating relationship to said flat surface on said first alignment means and operatively related to said second member; orifice means formed in said flat surface on said second alignment means, said orifice means being formed so as to establish a varying pressure at the outlet thereof when said flat surfaces on said first and second alignment means are moved relative to one another to vary the spacing therebetween; positioning means for adjustably positioning said second member relative to said first member; and control means responsive to the varying pressure at the outlet of said orifice means for controlling said positioning means to adjustably position said second member relative to said first member to establish and maintain a predetermined pressure at the outlet of said orifice means.

5. A dimensional control system for automatically applying pressure to an article, as required, during the forming of said article, to provide uniform and exact dimension to said article in the direction of the applied pressure comprising, in combination: a first member having a flat surface formed thereon; a second member adapted to be adjustably positioned relative to said first member to vary the pressure exerted upon an article therebetween, said second member having a flat surface thereon in mating relationship to said flat surface on said first member; orifice means formed in said flat surface on said second member, said orifice means being formed so as to establish a varying pressure at the outlet thereof when said flat surfaces on said first and second members are moved relative to one another to vary the spacing therebetween; positioning means for adjustably positioning said second member relative to said first member; and control means responsive to the varying pressure at the outlet of said orifice means for controlling said positioning means to adjustably position said second member relative to said first member to establish and maintain a predetermined pressure at the outlet of said orifice means.

6. A dimensional control system for a hydraulic press having hydraulic means, a fixed platen and a movable platen adapted to be adjustably positioned relative to said fixed platen by said hydraulic means for automatically applying pressure to an article, as required, during the forming of said article, to provide uniform and exact dimension to said article in the direction of the applied pressure comprising, in combination: orifice means formed in said fixed platen, said orifice means being formed so as to establish a varying pressure at the outlet thereof when said movable platen is moved relative to said fixed platen to vary the spacing therebetween; and control means responsive to the varying pressure at the outlet of said orifice means for controlling said hydraulic means to adjustably position said movable platen relative to said fixed platen to establish and maintain a predetermined pressure at the outlet of said orifice means.

7. A dimensional control system, as claimed in claim 6, wherein said orifice means comprising a circular groove having a predetermined inner and outer radius and a predetermined depth, an aperture centrally positioned within said inner radius and adapted to have a source of pneumatic pressure coupled thereto, the surface material within said inner radius being removed so as to permit pneumatic pressure to flow from said aperture into said groove.

8. A dimensional control system for a hydraulic press having a fixed platen, a movable platen and a hydraulic system including valve means for bleeding hydraulic fluid from said hydraulic system to adjustably position said movable platen relative to said fixed platen for automatically applying pressure to an article, as required, during the forming of said article, to provide uniform and exact dimension to said article in the direction of the applied pressure, said dimensional control system comprising, in combination: orifice means formed in said fixed platen, said orifice means being formed so as to establish a varying pressure at the outlet thereof when said movable platen is moved relative to said fixed platen to vary the spacing therebetween; valve control means coupled to said valve means; and control means responsive to the varying pressure at the outlet of said orifice means for operating said valve control means to bleed hydraulic fluid form said hydraulic system as required to adjustably position said movable platen relative to said fixed platen to establish and maintain a predetermined pressure at the outlet of said orifice means.

9. A dimensional control system for a hydraulic press having a fixed platen, a movable platen and a hydraulic system including valve means for bleeding hydraulic fluid from said hydraulic system to adjustably position said movable platen relative to said fixed platen for automatically applying pressure to an article, as required, during the forming of said article, to provide uniform and exact dimension to said article in the direction of the applied pressure, said dimensional control system comprising, in combination; orifice means formed in said fixed platen, said orifice means being formed so as to establish a varying pressure at the outlet thereof when said movable platen is moved relative to said fixed platen to vary the spacing therebetween; valve control means coupled to said valve means; and control means including relay means for controlling the operation of said positioning means to adjustably position said second member relative to said first member and means responsive to the varying pressure at the outlet of said orifice means for controlling the operation of said relay means to establish and maintain a predetermined pressure at the outlet of said orifice means.

10. A dimensional control system for a hydraulic press having a fixed platen, a movable platen and a hydraulic system including valve means for bleeding hydraulic fluid from said hydraulic system to adjustably position said movable platen relative to said fixed platen for automatically applying pressure to an article, as required, during the forming of said article, to provide uniform and exact dimension to said article in the direction of the applied pressure, said dimensional control system comprising, in combination: orifice means formed in said fixed platen, said orifice means being formed so as to establish a varying pressure at the outlet thereof when said movable platen is moved relative to said fixed platen to vary the spacing therebetween; motor means coupled to said valve means; and control means including pressure responsive means for detecting the varying pressure at the outlet of said orifice means, a slave relay coupled to and operated by said pressure responsive means, a sensing control circuit including a first and a second relay each having a plurality of contacts, a pair of contacts on said slave relay for controlling the operation of said first and said second relay, respectively, and a motor control circuit for controlling the direction of rotation of said motor means, said motor control circuit including a first and a second motor control relay each having a coil and a plurality of contacts, a source of power coupled to said coils, said contacts of said first and second relays being included in said coupling for alternately coupling one of said coils of said motor control relays to said source of power in accordance with the operation of said first and said second relay, respectively, said plurality of contacts of said first and second motor control relays being included in the coupling between said motor and a source of power and adapted to reverse the direction of current flow through said motor, to operate said valve means to bleed hydraulic fluid from said hydraulic system as required to adjustably position said movable platen relative to said fixed platen to establish and maintain a predetermined pressure at the outlet of said orifice means.

11. A dimensional control system for a hydraulic press having a fixed platen, a movable platen and a hydraulic system including valve means for bleeding hydraulic fluid from said hydraulic system to adjustably position said movable platen relative to said fixed platen for automatically applying pressure to an article as required, during the forming of said article, to provide uniform and exact dimension to said article in the direction of the applied pressure, said dimensional control system comprising, in combination: orifice means formed in two diagonally opposed corners of said fixed platen, said orifice means forming a varying pressure at the outlet thereof when said movable platen is moved relative to said fixed platen to vary the spacing therebetween; motor means coupled to said valve means; and control means including pressure responsive means for detecting the varying pressure at the outlet of said orifice means, a slave relay coupled to and operated by said pressure responsive means, a sensing control circuit including a first and a second relay each having a plurality of contacts, a pair of contacts on said slave relay for controlling the operation of said first and said second relay, respectively, and a motor control circuit for controlling the direction of rotation of said motor means, said motor control circuit including a first and a second motor control relay each having a coil and a plurality of contacts, a source of power coupled to said coils, said contacts of said first and second relays being imbedded in said coupling for alternately coupling one of said coils of said motor control relays to said source of power in accordance with the operation of said first and said second relay, respectively, said plurality of contacts of said first and second motor control relays being included in the coupling between said motor and a source of power and adapted to reverse the direction of current flow through said motor, to operate said valve means to bleed hydraulic fluid from said hydraulic system as required to adjustably position said movable platen relative to said fixed platen to establish and maintain a predetermined pressure at the outlet of said orifice means.

12. A hydraulic press for automatically applying pressure to an article, as required, during the forming of said article, to provide uniform and exact dimension to said article in the direction of the applied pressure comprising, in combination: a frame; a fixed platen within said frame; a movable platen secured within said frame and adapted to be adjustably positioned relative to said fixed platen; hydraulic means including a hydraulic pump having an outlet coupled to a hydraulic cylinder for raising said movable platen; valve means included in the coupling between said hydraulic cylinder and the outlet of said hydraulic pump for bleeding fluid from the supply delivered to said hydraulic cylinder; orifice means formed in the surface of said fixed platen, said orifice means being formed so as to establish a varying pressure at the outlet thereof when said fixed and movable platens are moved relative to one another to vary the spacing therebetween; valve control means coupled to said valve means for controlling the operation of said valve means and control means responsive to the varying pressure at the outlet of said orifice means for controlling said valve control means to adjustably position said movable platen relative to said fixed platen to establish and maintain a predetermined pressure at the outlet of said orifice means.

13. A dimensional control system, as claimed in claim 12, wherein said orifice means comprising a circular groove having a predetermined inner and outer radius and a predetermined depth, an aperture centrally positioned within said inner radius and adapted to have a source of pneumatic pressure coupled thereto, the surface material within said inner radius being removed so as to permit pneumatic pressure to flow from said aperture into said groove.

14. A hydraulic press for automatically applying pressure to an article, as required, during the forming of said article, to provide uniform and exact dimension to said article in the direction of the applied pressure comprising, in combination: a fixed platen; a movable platen adapted to be adjustably positioned relative to said fixed platen; hydraulic means including a hydraulic pump for supplying hydraulic fluid to adjustably position said movable platen; a relief valve included in said hydraulic means for bleeding fluid from the supply delivered to adjustably position said movable platen; orifice means formed in the surface of said fixed platen, said orifice means being formed so as to establish a varying pressure at the outlet thereof when said fixed and movable platens are moved relative to one another to vary the spacing therebetween; motor means coupled to said relief valve for controlling the operation of said relief valve; control means for controlling the operation of said motor means; and sensing control means responsive to the varying pressure at the outlet of said orifice means for controlling said motor means to operate said relief valve to regulate the hydraulic fluid supplied to adjustably position said movable platen relative to said fixed platen to establish and maintain a predetermined pressure at the outlet of said orifice means.

15. A hydraulic press for automatically applying pressure to an article, as required, during the forming of said article, to provide uniform and exact dimension to said article in the direction of the applied pressure comprising, in combination: a frame, a fixed platen within said frame; a movable platen secured within said frame and adapted to be adjustably positioned relative to said fixed platen; hydraulic means including a first and a second hydraulic pump each having an outlet which is coupled to a common conduit for delivering hydraulic fluid to a hydraulic cylinder for raising said movable platen; valve means included in said common conduit for bleeding fluid from the supply delivered to said hydraulic cylinder; orifice means formed in the surface of said fixed platen, said orifice means being formed so as to establish a varying pressure at the outlet thereof when said fixed and movable platens are moved relative to one another to vary the spacing therebetween; valve control means coupled to said valve means for controlling the operation of said valve means; and control means responsive to the varying pressure at the outlet of said orifice means for controlling said valve control means to adjustably position said movable platen relative to said fixed platen to establish and maintain a predetermined pressure at the outlet of said orifice means.

16. A hydraulic press for automatically applying pressure to an article, as required, during the forming of said article, to provide uniform and exact dimension to said article in the direction of the applied pressure comprising, in combination: a fixed platen; a movable platen adapted to be adjustably positioned relative to said fixed platen; hydraulic means including a first and a second hydraulic pump which deliver hydraulic fluid into a single conduit coupled to hydraulic cylinder means for adjustably positioning said movable platen; a relief valve included in the coupling between said hydraulic cylinder means and said first and second hydraulic pumps for bleeding fluid from the supply delivered to said hydraulic cylinder means; orifice means formed in the surface of said fixed platen, said orifice means being formed so as to establish a varying pressure at the outlet thereof when said fixed and movable platens are moved relative to one another to vary the spacing therebetween; motor means coupled to said relief valve for controlling the operation of said relief valve; control means for controlling the operation of said motor means; and sensing control means responsive to the varying pressure at the outlet of said orifice means for controlling said motor means to operate said relief valve to regulate the hydraulic fluid supplied to adjustably position said movable platen relative to said fixed platen to establish and maintain a predetermined pressure at the outlet of said orifice means.

17. A hydraulic press for automatically applying pressure to an article, as required, during the forming of said article, to provide uniform and exact dimension to said article in the direction of the applied pressure comprising, in combination: a frame; a fixed platen within said frame; a movable platen secured within said frame and adapted to be adjustably positioned relative to said fixed platen; hydraulic means including a first hydraulic pump having an outlet coupled to said cylinder and a second hydraulic pump having an outlet coupled to the outlet of said first hydraulic pump; valve means included in the coupling between said cylinder and the outlet of said first and second hydraulic pumps for bleeding fluid from the supply delivered to said cylinder; orifice means formed in the surface of said fixed platen, said orifice means forming a varying pressure at the outlet thereof when said fixed and movable platens are moved relative to one another to vary the spacing therebetween; motor means coupled to said valve means for controlling the operation of said valve means; and control means including pressure responsive means for detecting the varying pressure at the outlet of said orifice means, a slave relay coupled to and operated by said pressure responsive means, a sensing control circuit including a first and a second relay each having a plurality of contacts, a pair of contacts on said slave relay for controlling the operation of said first and said second relay, respectively, and a motor control circuit for controlling the direction of rotation of said motor means, said motor control circuit including a first and a second motor control relay each having a coil and a plurality of contacts, a source of power coupled to said coils, said contacts of said first and second relays being included in said coupling for alternately coupling one of said coils of said motor control relays to said source of power in accordance with the operation of said first and said second relay, respectively, said plurality of contacts of said first and second motor control relays being included in the coupling between said motor and a source of power and adapted to reverse the direction of current flow through said motor, to operate said valve means to bleed hydraulic fluid from said hydraulic system as required to adjustably position said movable platen relative to said fixed platen to establish and maintain a predetermined pressure at the outlet of said orifice means.

18. A hydraulic press for automatically applying pressure to an article, as required, during the forming of said article, to provide uniform and exact dimension to said article in the direction of the applied pressure comprising, in combination: a frame; a work table; a fixed platen within said frame; a movable platen secured within said frame and adapted to be adjustably positioned relative to said first platen; a hydraulic system including a hydraulic pump for delivering hydraulic fluid to a hydraulic cylinder adapted to adjustably position said movable platen; a relief valve included in the coupling between said hydraulic cylinder and said hydraulic pump for bleeding fluid from the supply delivered to said cylinder as required to adjustably position said movable platen; said hydraulic system also including a plurality of valve means having solenoids for controlling the operation thereof, said solenoids being operatively included in said press control circuit and operated in a predetermined fashion to control said press to automatically position said work table in said press and to control the adjustable positioning of said movable platen, timer means for establishing a preheat timing cycle and a cure timing cycle; orifice means formed in the surface of said fixed platen, said orifice means being formed so as to establish a varying pressure at the outlet thereof when said fixed and movable platens are moved relative to one another to vary the spacing therebetween; valve control means coupled to said relief valve for controlling the operation of said relief valve; control means responsive to the varying pressure at the outlet of said orifice means for controlling said valve control means to adjustably position said movable platen relative to said fixed platen to establish and maintain a predetermined pressure at the outlet of said orifice means.

References Cited

UNITED STATES PATENTS

| | | | |
|---|---|---|---|
| 2,389,169 | 11/1945 | Stacy | 18—16 X |
| 2,432,215 | 12/1947 | Stocker | 18—17 |
| 2,487,126 | 1/1949 | Greer | 18—17 |
| 2,923,973 | 2/1960 | Ninneman | 18—16 |
| 3,079,632 | 3/1963 | Peickii | 18—17 X |
| 3,082,478 | 3/1963 | Hawkins | 18—17 |
| 3,089,188 | 5/1963 | Hoffmann | 18—16 |
| 3,343,217 | 9/1967 | Daubenberger | 18—16 |

J. HOWARD FLINT, Jr., *Primary Examiner.*